United States Patent [19]

Fujimura et al.

[11] Patent Number: 4,744,082
[45] Date of Patent: May 10, 1988

[54] MULTIPLEXER APPARATUS HAVING NBMB CODER

[75] Inventors: Hiroshi Fujimura; Kiyoaki Kawai, both of Tokyo, Japan

[73] Assignee: Nippon Electric Co., Ltd., Tokyo, Japan

[21] Appl. No.: 473,393

[22] Filed: Mar. 8, 1983

[30] Foreign Application Priority Data

Mar. 9, 1982 [JP] Japan ................................. 57-35823

[51] Int. Cl.[4] ............................................. H04J 3/04
[52] U.S. Cl. ..................................... 370/112; 370/102
[58] Field of Search .................. 370/100, 112, 102, 4, 370/109

[56] References Cited

U.S. PATENT DOCUMENTS

| 4,157,458 | 6/1979 | Roche | 370/112 |
| 4,330,856 | 5/1982 | Takasaki et al. | 370/102 |
| 4,345,323 | 8/1982 | Chang | 370/112 |
| 4,359,779 | 11/1982 | Suzuka | 370/100 |
| 4,410,980 | 10/1983 | Takasaki et al. | 370/102 |

OTHER PUBLICATIONS

"Experimental Multi-Fiber, Optical Cable, Inter-Exchange Digital Links", by J. E. Fulenwider et al., 23rd I.C.E., Rome, Italy, (22-24 Mar. 1976).

"A 140 Mbit/s Optical Transmission System with 8 km Repeater Spacing and Line Section Length of 96 km", K. Mouthaan et al., Philips' Telecommunicatie Industrie.

"Binary Line Codes for Digital Transmission on Optical Fibers", Optical Communication Conference, Amsterdam, Sep. 17-19, 1979.

Primary Examiner—Douglas W. Olms
Assistant Examiner—Wellington Chin
Attorney, Agent, or Firm—Sughrue, Mion, Zinn, Macpeak, and Seas

[57] ABSTRACT

A multiplexing communication system for combining several asynchronous digital signals 151, 156 into a single high-speed line 141 comprising synchronizing circuits 101, 106 on each on n input data lines, service information insertion circuits 180 on each of the n synchronized lines, an nBmB coder 130 utilizing a pulse stuffing circuit 170 for increasing the n synchronized signals to m synchronized signals, and a multiplexer 140 for converting the m synchronized signals into a single high speed output 141.

9 Claims, 6 Drawing Sheets

MULTIPLEXER APPARATUS HAVING NBMB CODER

BACKGROUND OF THE INVENTION

The present invention relates to a time-division multiplex pulse code modulation (PCM) system for use in combining multiple digital data streams into a single high-speed output bit stream, and more particularly to a multiplexer apparatus having a line code converting function built into it.

Generally in a digital transmission system, the consecutive occurrence of the same code, "0", "1", in a line code stream would make it difficult for each repeater to extract timing, or invite the wandering of the D.C. level of the pulse string under the effects of D.C. component restriction, in turn resulting in such adverse effects as intersymbol interference. To avoid these undesirable consequences, such line codes are selected as would be able to keep the consecutive occurence of the same code within a certain number of bits in any input code stream and further to suppress the mark density fluctuation.

For conversion into such line codes, there are currently in use multi-value coding (including bipolar coding, for instance) and block coding (including nBmB coding or nB1C coding) among other conversion techniques.

In an optical digital transmission system where the light intensity is modulated with digital signals, multi-value coding is undesirable in view of its low S/N ratio, and block coding is usually employed instead. Among various block coding techniques, nBmB coding, by which each block of n bits are converted into one block code consisting of m bits, is considered to give the most desirable line codes.

In a usual nBmB coding process, a single high-speed bit stream once multiplexed is again separated by a serial-to-parallel converting circuit into n bit streams, each set of whose n mutually corresponding bits constitute an address word for a programmable read only memory (P-ROM), wherein a table of codes is registered with each of multiple n-bit words. The P-ROM output code words, each of which is composed of m bits corresponding to each one of the address words. This m-bit code word or block is further converted into a single signal stream by a parallel-to-serial converting circuit. For an example of this process, reference may be made to "A 140 Mbit/s Optical Transmission System with 8 km Repeater Spacing and Line Section Length of 96 km" by K. Mouthaan and J. R. Schlechte, Conference Proceedings of Optical Communication Conference, Amsterdam, Sept. 17–19, 1979.

Such an nBmB coding process, however, requires an n-bit serial-to-parallel converter and an m-bit parallel-to-serial converter, both operating at high speed, besides an nBmB line coder, and consequently invites greater hardware size, higher cost and lower reliability.

SUMMARY OF THE INVENTION

A primary object of the present invention, therefore, is to provide a multiplexer apparatus for nBmB coding structured in a novel way.

According to the invention, an apparatus for combining a plurality of input data bit streams into a single output bit stream comprises: means for synchronizing each of n input data bit streams to produce n synchronized bit streams; means for converting mutually corresponding parallel n bits of the n synchronized bit streams into parallel m bits to produce m synchronized bit streams; and means for multiplexing the m synchronized bit streams into a single high-speed output bit stream.

The invention, according to which parallel m bit signals, obtained by nBmB-converting before multiplexing, are multiplexed in to a single high-speed bit stream, requires neither an n bit serial-to-parallel converter nor an m bit parallel-to-serial converter. The dispensation with such converters, which would need high-speed operation, leads to less expensive and smaller circuitry.

The invention will be more readily appreciated by those skilled in the art after reading the following detailed description taken in conjunction with the accompanying drawings.

DETAILED DESCRIPTION OF THE PREFERRED EMBODIMENTS

Figure 1:
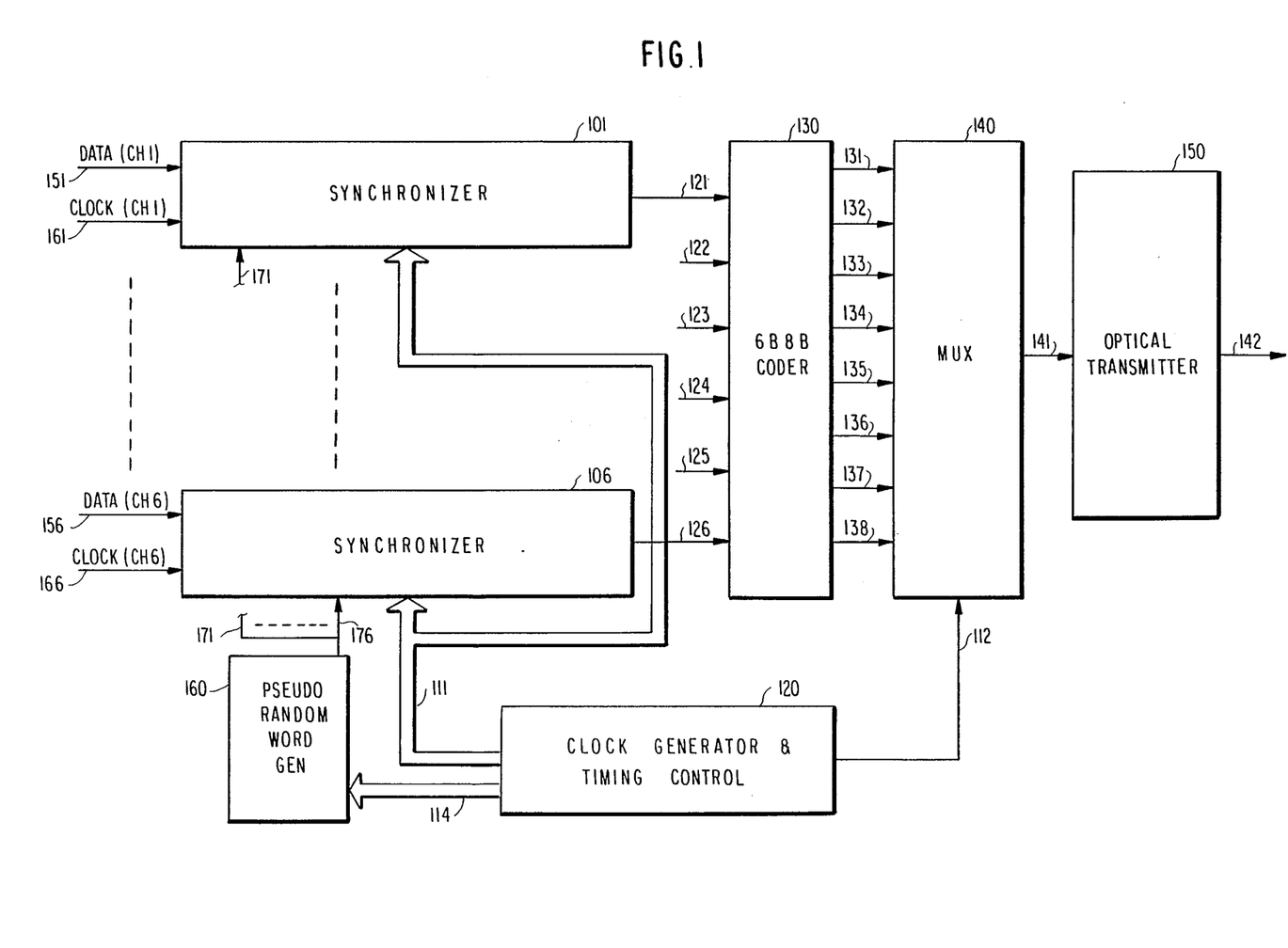
FIG. 1 is a schematic block diagram of a multiplexer apparatus constructed in accordance with the present invention.

Referring to FIG. 1, a multiplexer apparatus according to the present invention primarily comprises six synchronizers 101–106 corresponding to six channels, a 6B8B coder 130, a multiplexer circuit 140, a clock generator and timing control circuit 120 for common use by the six channels, and a pseudo-random word generator 160. This multiplexer apparatus has the function to combine digital data streams from six input channels, after they are nBmB-converted, into a single high-speed bit stream fed to a line 141. The bit streams coupled to the input terminals of this multiplexer apparatus have a bit rate of about 45 Mbits/second. It is well known that bit streams of this type can be obtained as multiplexed bit streams of PCM multiplexing hierarchy tertiary level. However, it may be readily understood that, according to the present invention, any other plurality of high-speed digital data streams can be used for combination into a single high-speed bit rate.

The bit streams supplied as inputs to the multiplexer apparatus are asynchronous with one another, and therefore they have to be synchronized in order to be combined into a single bit interleaved stream. In this embodiment of the invention, synchronization is achieved by the well known pulse stuffing technique. The higher-speed output bit stream on line 141 operates at a higher rate than the data from the six channels on lines 151 and 156;, which have to be transmitted, plus the bit stream must transmit the information needed for synchronization and housekeeping. To establish this relationship, extra bit spaces or time slots are provided in the higher-speed output bit stream.

The input bit stream of every channel 151 or 156 is coupled to a synchronizer apparatus 101 or 106. Though only the synchronizers 101 and 106 for channels 1 and 6, respectively, are represented in FIG. 1 to simplify the illustration, it is understood that all other channels have their own synchronizer apparatus.

Figure 2:
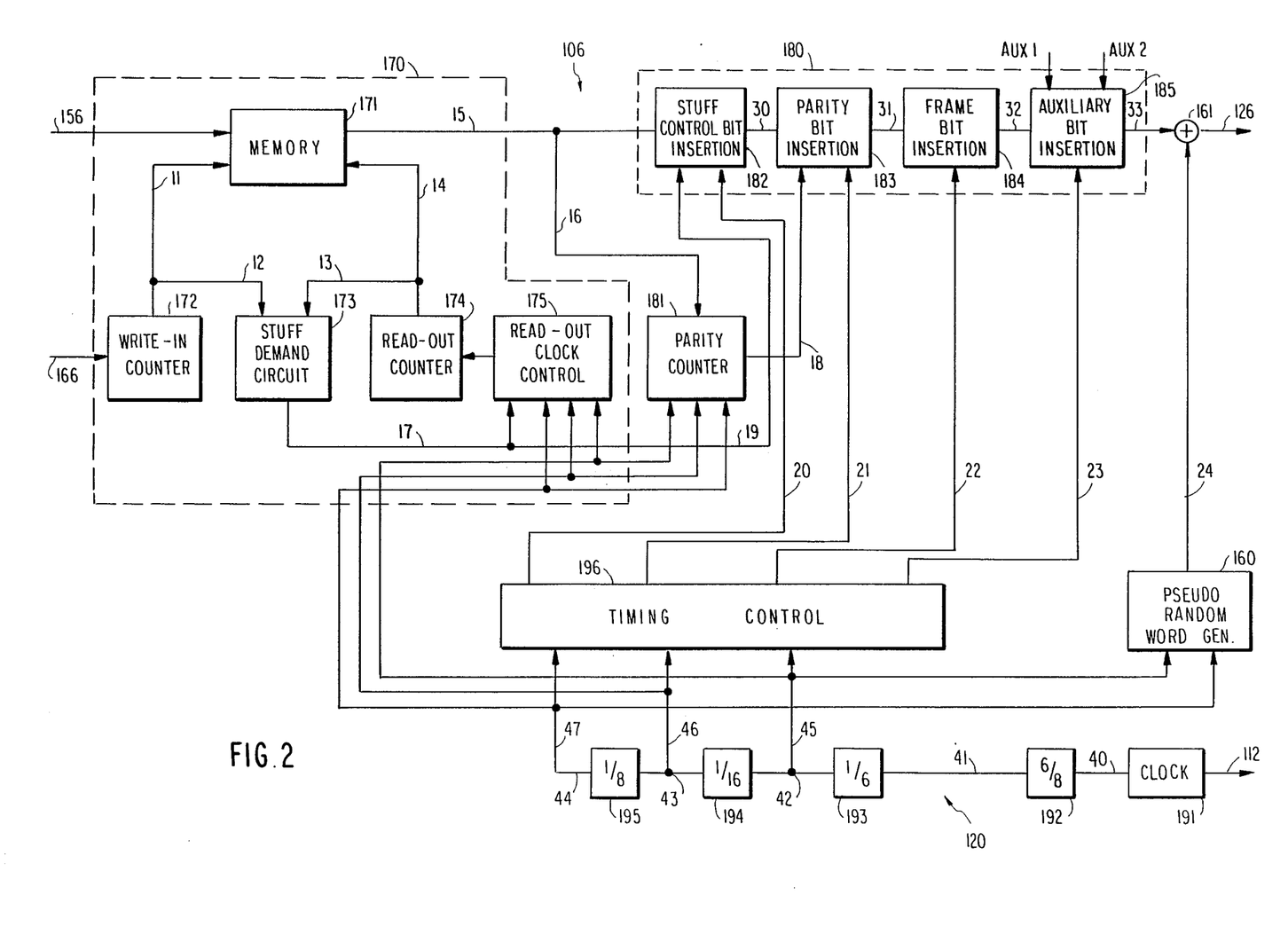
FIG. 2 is a schematic block diagram of a synchronizer and a clock and timing control circuit for use in the multiplexer apparatus of FIG. 1.

Referring now to FIG. 2, the 6th channel synchronizer is illustrated with a clock and timing control circuit and a pseudo-random word generator which are for use in common with all other channels. The 6th channel synchronizer 106 primarily comprises a stuff synchronizing circuit 170, a service bit insertion circuit 180, a parity counter 181 and an EXCLUSIVE OR gate 161. The stuff synchronizing circuit 170 has a buffer memory 171 for storing bits in a lower order group of data bit streams. Into this buffer memory 171 are written data on a line 156 by a write-in counter 172 acting in response to clocks on a line 166. Data in this buffer memory 171 are read out by a read-out counter 174 acting in response to read clocks. For instance, in response to an address signal on a line 14, bits in the buffer memory 171 are coupled to a line 15 with the oldest bit read first. The bit rates of asynchronous signals to be multiplexed are set slightly below the bit rates required for the synchronizer output. Therefore, the read clock rate is slightly above the write clock rate. Since every channel uses a clock source of the same bit rate, the output signals from the buffer memories of all the channel synchronizers are in synchronism with one another.

Figure 3:
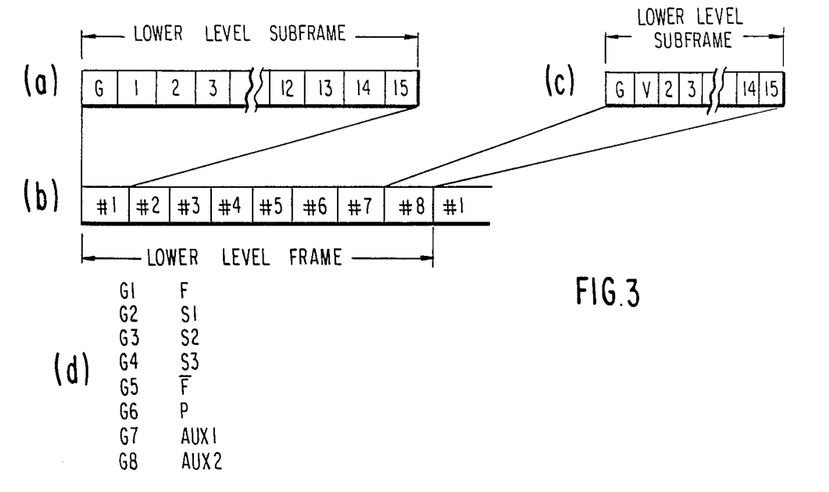
FIG. 3 is a diagrammatic representation of the data format of synchronized digital tertiary level form in PCM multiplexing hierarchy.

A read-out counter 174 receives a read clock from a read-out clock control circuit 175. The read clock is obtained by frequency-dividing by eight the clock $f_o$ of a master clock 191 with a 6/8-divider 192 and a 1/6-divider 193. The read-out clock control circuit 175, receiving signals from the 1/6-divider 193, a 1/16-divider 194, a ½-divider 195 and a stuff demand circuit 173, inhibits the read clock. As the read-out counter 174 is kept from running during the resultant inhibition period, no new data bits are read out of the memory 171, and the data in the bit interval immediately preceding the inhibition continues to be supplied, with new time slot being added. To describe the process in further detail, the read-out clock control circuit 175 inhibits every one out of 16 read clock pulses and one time slot is added to the line 15 on every such inhibition. The line 15 is thus supplied the format of a synchronized lower-order group of subframes, consisting of this time slot and other time slots for 15-bit groups of data output from the memory 171. The time slot inserted as the leading bit of the subframe format thereby obtained is used as a service information bit. Thus a frame belonging to the synchronized lower-order group, whose frame and subframe format are illustrated in FIG. 3, consists of eight subframes, whose service information bits $G_1, G_2 \ldots G_8$ are used in the following way: $G_1$ for frame synchronization (F); $G_2$ as stuffing information ($S_1$); $G_3$ as stuffing information ($S_2$); $G_4$ as stuffing information ($S_3$); $G_5$ for frame synchronization ($\bar{F}$); $G_6$ for parity (P), and $G_7$ and $G_8$ as a switch control pulse, an alarm sending pulse or for an order wire (AUX1, AUX2). These service information bits will be explained in further detail later on.

Returning now to FIG. 2, the read-out clock control 175 can inhibit the read clock in response to the output of a frequency divider 195, or one out of every 128 read clock pulses. This inhibition is so positioned as to provide a time slot immediately following the time slot for a service bit of the 8th sub-frame (FIG. 3. (C) (b)). However, this inhibition, which may take place once per 128 clock pulses, is effected by a demand signal from a demand circuit 173. More specifically, the read-out clock control circuit 175 inhibits the read clock in response to the output pulse of the frequency divider 195 but only after the receipt of a demand signal from a demand circuit 173, stops the running of the read-out counter and adds at that position, as a result, additional time to the slot. This process is called pulse stuffing. This time slot does not necessarily appear once for every 128 clock pulses, but it emerges only when the phase difference between the write-in counter 172 and the read-out counter 174 exceeds a prescribed threshold. Thus, even if 128 clock pulses have come, the read clock will not be inhibited unless said phase difference surpasses the prescribed value, and instead data in the memory will continue to be read out. For this reason, this time slot is called a variable time slot. What contains the variable time slot V is the 8th subframe, whose format is shown in FIG. 3(c).

The stuff demand circuit 173 compares the phases of the output signal of the write-in counter 172 and of that of the read-out counter 174 and, when their phase difference exceeds a prescribed level, gives a stuff demand pulse to the read-out clock control 175 and to a stuff control bit insertion circuit 182. The action of the read-out clock control circuit 175 after receiving the stuff demand signal was already described. As mentioned above, upon stuffing, the phase difference between the write-in counter 172 and the read-out counter 174 is recovered, and the stuff demand signal is turned off. The above described stuff synchronization is well known to those skilled in the art, and stated in detail in, for instance, the U.S. Pat. No. 3,042,751.

When the stuff demand signal is turned on, the stuff control bit insertion circuit 182 inserts $S_1$="1", $S_2$="1" and $S_3$="1" into the service bit time slots of the 2nd, 3rd and 4th subframes, respectively, on the output signals from the buffer memory 171. When the stuff demand signal is off, $S_1$="0", $S_2$="0" and $S_3$="0" are inserted. The bit insertion is achieved by a timing control circuit 196 in response to clock pulses from the dividers 193, 194 and 195.

In this manner, whether or not stuffing has been achieved is denoted by the service bits $S_1$, $S_2$ and $S_3$.

The synchronized lower-order bit stream, which comprises output signals of the buffer memory 171, is branched to be fed to a parity counter 181. The parity counter 181 counts, and feeds to a parity bit insertion circuit 183, the number of digits "1" in the bit stream except those in the newly inserted time slots. When the count of digits "1" per frame is an odd number, P="1" is inserted into the 6th service bit time slot in one frame of the output bit stream from a stuff control bit insertion circuit 182, or when the count is an even number, P="0" is.

The timing of this insertion, too, is given by the timing control circuit 196. The parity counter 181 is reset at every 128th read clock pulse.

Into a bit stream emerging on the line 31 as the output of the parity bit insertion circuit 183 are inserted bits for framing by a frame bit insertion circuit 184. This is achieved by inserting F="1" and $\bar{F}$="0" into the service bit time slots of the 1st and 5th subframes, respectively. The timing of this insertion, again, is given by the timing control circuit 196.

An auxiliary bit insertion circuit 185 inserts, as required, information on the sending of a switch control pulse or an alarm pulse or the sending of a order wire bit into the service bit time slot of the 7th or 8th subframe. Information appearing at the terminal AUX1 or AUX2 is thereby inserted in accordance with a timing signal from the timing control circuit 196.

The bit stream thereby obtained, having the format shown in FIG. 3, is coupled to the EXCLUSIVE OR gate 161, and modulated with a pseudo-random bit sequence generated by the pseudo-random word generator 160, which, receiving clock signals from the dividers 193 and 195, supplies pseudo-random bit sequences whose bit rate is the same as that of the read clock and whose length is 128 bits. A shift register of this type is well known to those skilled in the art. See, for example, pages 349 to 355 of Digital Integrated Electronics by Herbert Taub and Donald Schilling, McGraw-Hill, Inc., 1977.

Scrambing by this pseudo-random word generator 160 gives improved signal statistics in the sense that a better DC balance and bitter timing are achieved upon regeneration.

Since the role of each time slot is unchanged by scramling, on a line 126 is obtained, as the output of the EXCLUSIVE OR gate, a bit stream having the data format shown in FIG. 3.

Referring again to FIG. 1, on the channels 1 to 5 as well, there are generated bit streams having the same bit rate, bit-synchronized and having the same data format, and they are supplied to lines 121 to 125, respectively. The bit streams emerging on the lines 121 to 126 are fed to the 6B8B coder 130 consisting of a programmable read-only memory (P-ROM). This coder, into which bits, six of them constituting each block with each bit interval, are entered in parallel, gains access to the memory cells of the P-ROM designed by these six-bit codes and supplies lines 131 to 138 with parallel signals, whose blocks consist of eight bits each. In the P-ROM is stored a look-up table for conversion of six-bit into eight-bit codes.

This code conversion can be accomplished by the use of a 6B8B coding map given in Table 3 of an article entitled "Binary Line Codes for Digital Transmission in Optical Fibers", Study Group XVIII—Contribution No. 291, International Telegraph and Telephone Consultative Committee (CCITT), March 1979. Thus, an input word corresponding to the decimal number represented in a binary form by a six-bit input is looked up to in the column of input words, and an eight-bit code corresponding to that input word is sought for in the column of code words. Since this coding map is so constructed as to balance the numbers of "0" and "1" in the converted codes, the output high-speed bit rate obtained by multiplexing, as will be described later on, is adequate for extracting the timing and balancing the DC level on the receiving side.

Figure 4:
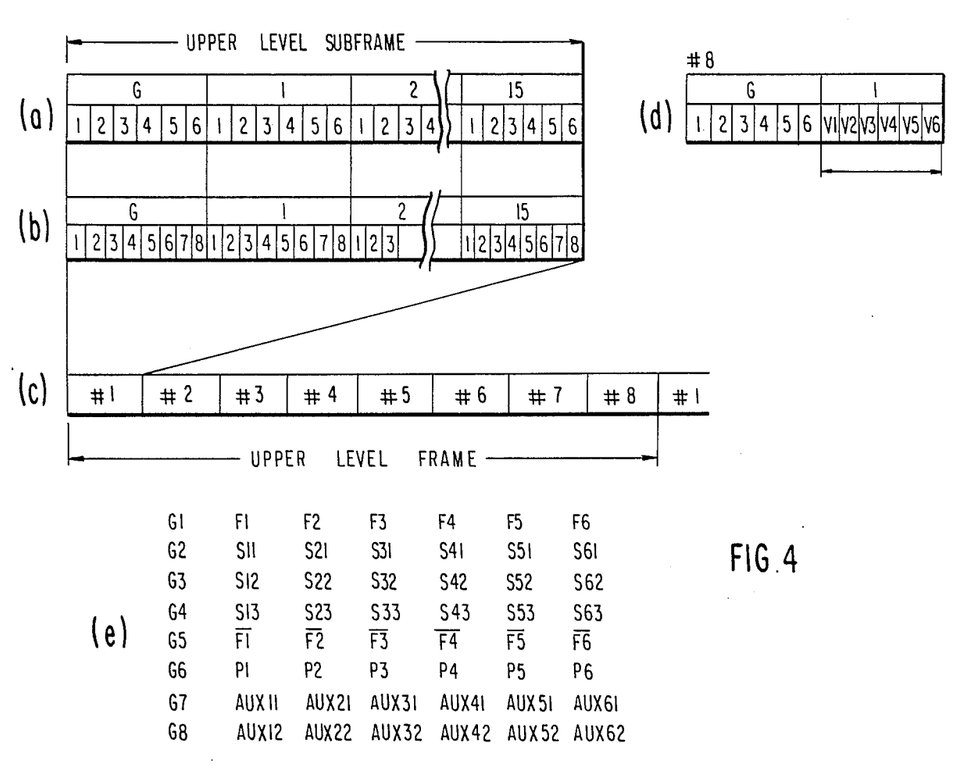
FIG. 4 illustrates the data format of digital quarternary level frame in PCM multiplexing hierarchy.

Since the six-bit streams having the frame format illustrated in FIG. 3(d) emerge on the input lines 121 to 126 to the 6B8B coder 130, information represented by a subframe consisting of 16 blocks G, 1, 2, . . . 15 as shown in FIG. 4(a), each comprising six bits appearing in each bit interval, is repeated in a pattern of eight subframes corresponding to one frame. In the leading block $G_n$ of each subframe up to the 8th, there appear service information bits shown in the first block of FIG. 4(a), and the sequence of such blocks is shown in FIG. 4(e).

The 2nd block of the 8th subframe corresponds to the variable time slots of each channel (FIG. 4(d)).

Every block code shown in FIG. 4(a) is converted by the 6B8B coder 130 into the corresponding one of the block codes shown in FIG. 4(b). Since the six bit streams entering the 6B8B coder 130 are stuff-synchronized by the synchronizers 101 to 106, each bit in the eight bit streams supplied to the lines 131 to 138 is synchronized, and the multiplexer circuit 140 samples each data pulse of the eight bit streams with a clock pulse obtained from the master clock 191, which is eight times as fast as the bit rate of the output bit stream from each synchronizer, and combines the eight bit streams into a single high-speed bit stream. The frame format of the high-speed bit stream thereby obtained is shown in FIG. 4(c). As this sort of multiplexer circuit is well known, details thereon are dispensed with herein.

Where a coaxial cable is used, an output multiplexed in this manner, which has already gone through 6B8B conversion in this multiplexer apparatus, can be directly fed to the cable as line codes.

In optical fiber transmission, the high-speed bit stream supplied t the line 141 is further supplied to an optical transmitter 150 and, after being amplified by a built-in driver circuit, is used as laser diode driving signals. The optical transmitter 150 supplies an optical fiber 142 with a light pulse bit stream corresponding to the high-speed bit stream. The U.S. Pat. No. 4,009,383 is incorporated herein by reference as an example of the optical transmitter.

Figure 5:
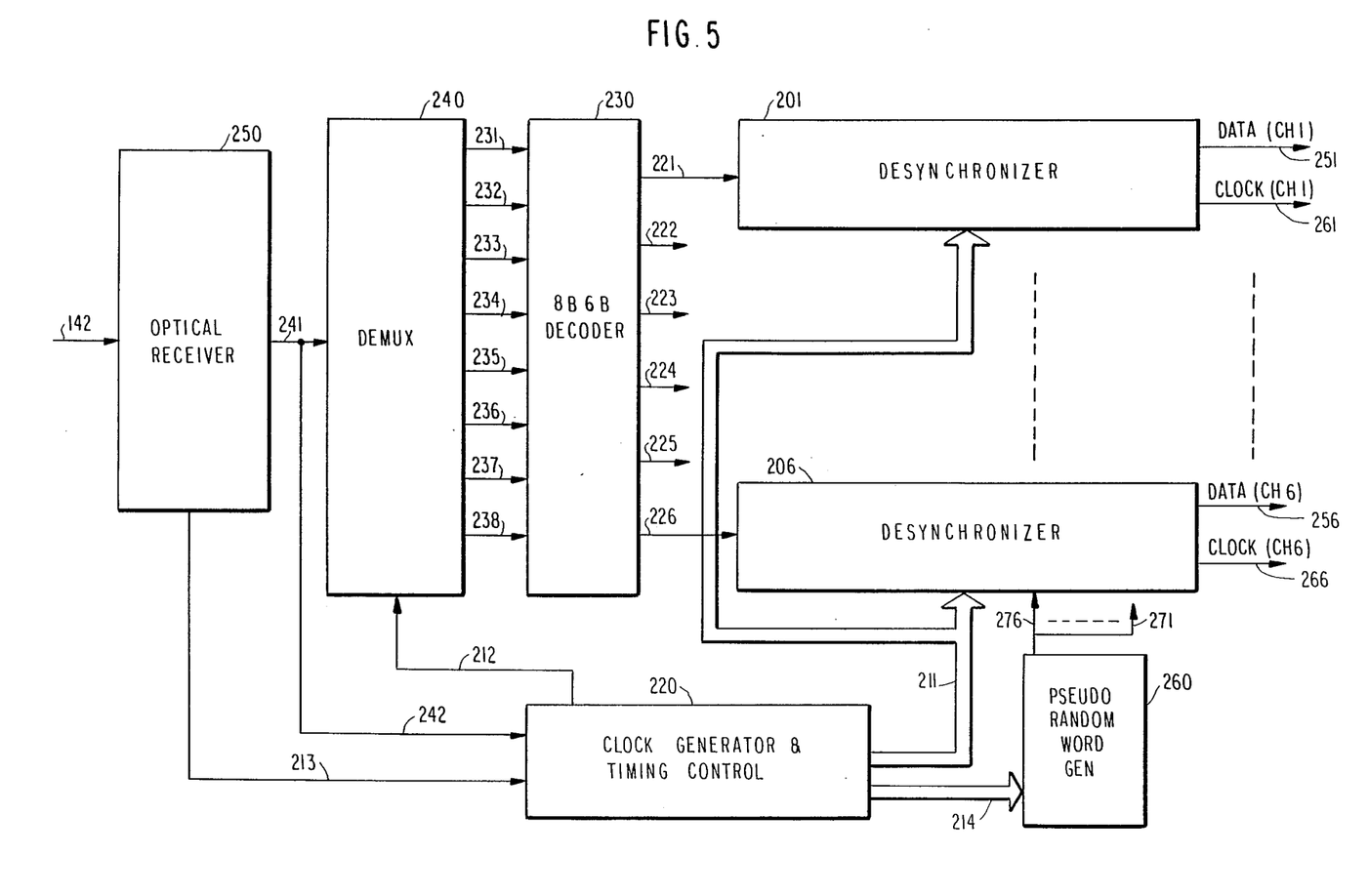
FIG. 5 is a schematic block diagram of a demultiplexer apparatus constructed in accordance with the present invention.

A demultiplexer apparatus illustrated in FIG. 5 performs a function inverse to the apparatus shown in FIG. 1. The high-speed bit light stream on the optical fiber 142, after being converted by an optical receiver 250 into a high-speed bit stream of electric signals, is separated by the demultiplexer apparatus into six lower-speed bit streams corresponding to the channels 1 to 6.

Many of the circuits used in the demultiplexer apparatus illustrated in FIGS. 5 and 6 function in a fashion identical to that described herein above for equivalent circuit in the multiplexer apparatus shown in FIGS. 1 and 2. Accordingly, the major circuits of FIGS. 5 and 6 are designated with numerals having tens and units digits equal to those of the reference numerals designating equivalent circuits in FIGS. 1 and 2.

The demultiplexer apparatus primarily comprises a demultiplexer circuit 240, an 8B6B decoder 230, desynchronizers 201 to 206, a clock generator and timing control circuit 220 and a pseudo-random word generator 260.

An optical receiver 250 mainly consists of an avalanche photodiode, a preamplifier AGC circuit and a regenerative circuit. The U.S. Pat. No. 4,019,048 is incorporated herein by reference. A high-bit rate clock regenerated by the optical receiver 250, going by way of a line 213, and a high-speed data bit stream going by way of a line 242, are supplied to the clock generator and timing control circuit 220 to be used for timing clock generation and frame synchronization, respectively. The clock generator and timing control circuit 220 also controls the supply of timing pulses to the demultiplexer circuit 240, the desynchronizers 201 to 206 and the pseudo-random word generator 260.

Figure 6:
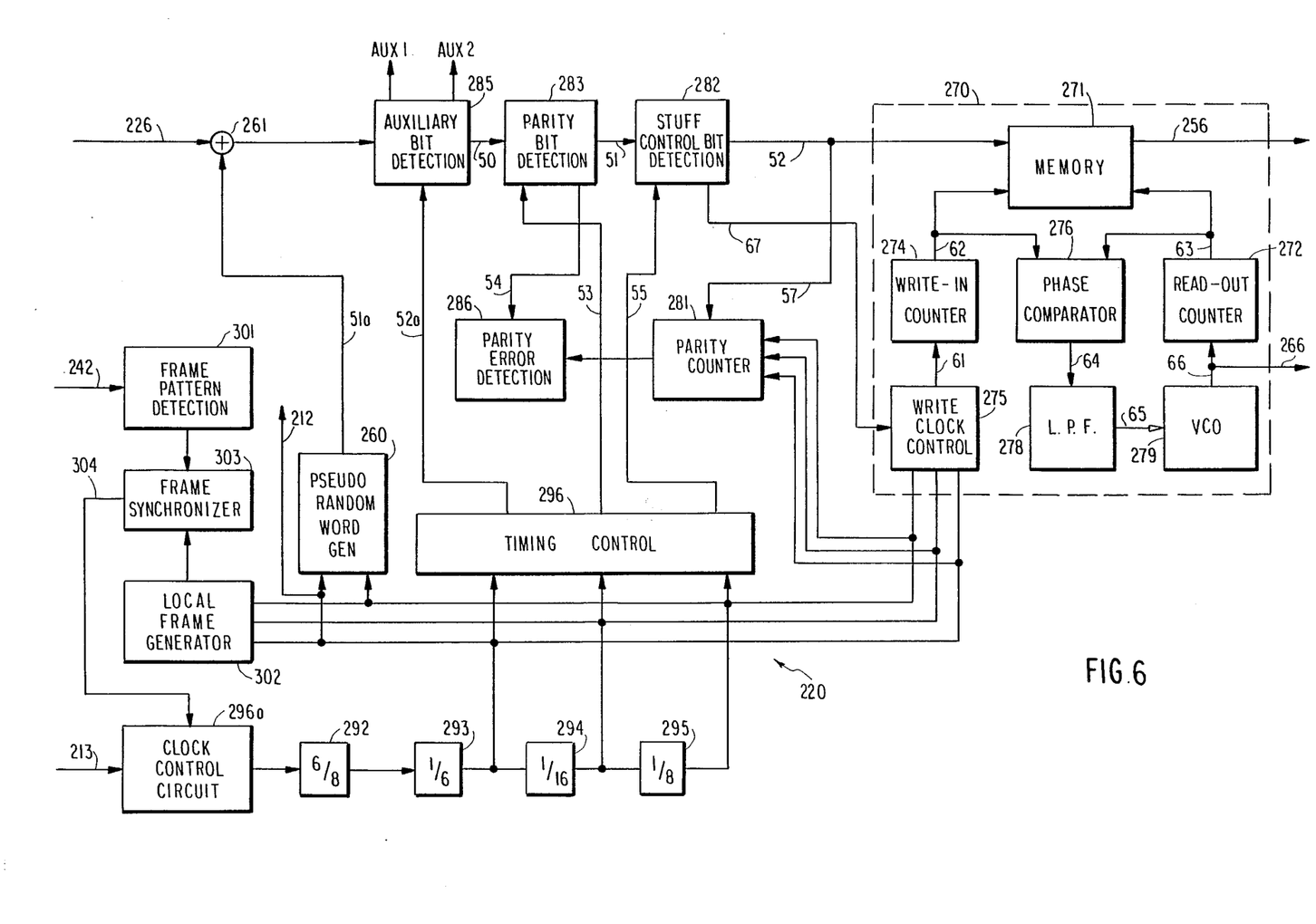
FIG. 6 is a schematic block diagram of a desynchronizer and a clock and timing control circuit for use in the demultiplexer apparatus of FIG. 6.

With reference to FIG. 6, the high-bit rate clock supplied via the line 213 is further fed through a clock control circuit 296a to a 6/8-divider 292, a 1/6-divider 293, a 1/16-divider 294 and ⅛-divider 295 to be used for supplying timing pulses needed at various stages.

In response to pulses from the dividers 293, 294 and 295, a local frame generator 302 generates a bit sequence for framing, which has the same frame pattern as the converted frame pattern obtained by 6B8B-converting a block code consisting of frame pulses sent from the transmitting side. A high-speed bit stream emerging on a line 241 is branched to be supplied to a frame pattern detector 301, which detects the frame pulse pattern of 6B8B-converted codes corresponding to the blocks $G_1$ and $G_5$ (FIG. 4(e)) explained with reference to the multiplexer apparatus. A frame synchronizer 303 compares the phases of the signals of this frame pattern detector 301 and the local frame generator 302, and supplies a clock pulse extraction signal to a line 304 so that frame synchronism can be achieved. When this extraction signal is on, the clock control circuit 296a inhibits a high-speed clock entered therein. Therefore, until the converted frame pattern generated by the local frame generator 302 on the basis of signals from the frequency dividers comes into phase with the frame pattern of the frame pulse detector 301, clock inhibition is successively achieved, and finally frame synchronism is attained on the receiving side so that the positions of service bits and data bits in received signals can be accurately grasped.

Concurrently referring to FIG. 5, in a frame-synchronized state, the demultiplexer circuit 240 separates the single bit stream into eight bit streams on lines 231 to 238 in response to a clock from the 1/6-divider 293 (this clock is produced by frequency-dividing the high-speed clock by eight). These eight bit streams are converted by the 8B6B decoder 230 into six bit streams. The 8B6B decoder 230, consisting of a P-ROM, stores a program to achieve inverse conversion to what was performed by the 6B8B coder 130 by the use of the same coding map used by the 6B8B coder 130. The six bit streams, each having the frame format of the synchronized lower-order group, are supplied to lines 221 to 226. Since this frame format is identical to what is shown in FIG. 3, this figure will be hereinafter directly used for description. As a service bit extraction circuit to be coupled to the lines, a descrambler and a stuff desynchronizer are identical in structure to the equivalent circuits in the multiplexer apparatus, circuits to be coupled to the line 226 are described below.

Referring to FIG. 6, a bit stream having the synchronized lower-order frame format is supplied to the descrambler consisting of the pseudo-random word generator 260 and an EXCLUSIVE OR gate 261. The pseudo-random word generator 260 has the same characteristics as what was described with reference to the multiplexer apparatus. Thus its maximum sequence length is 128 clock pulses, and synchronism is achieved at a bit rate equal to that of the bit stream. The descrambled bit stream is supplied to an auxiliary bit detector 285, and $G_7$ (AUX1) and $G_8$ (AUX2) are extracted by the timing control circuit 296 in synchronism with a pulse appearing on a line 52a. Further the bit stream has removed the parity information of the service information bit $G_6$ by a parity bit detector 283, and supplied to a parity error detector 286. The parity error detector 286 compares the parity information in the parity bit detector 283 with the count by a parity counter 281 of the number of the logic level "1" occurring in the bit stream emerging on the line after all its service information bits are removed and, if the two parity data are found identical, indicates the absence of error or, if not, the presence of an error. The action of this parity counter 281 is not described in any further detail here because it is the same as that of the parity counter 181 already described with reference to FIG. 2.

The bit stream supplied by way of the parity bit detector 283 to a line 51 is further fed to the stuff control bit detector 282, and in accordance with a timing signal given by the timing control circuit 296 has removed the stuff information bits $G_2$, $G_3$ and $G_4$, which are then supplied to a write clock control circuit 275. The bit stream, deprived of these service information bits, appears on the line 52 and is fed to a destuffing circuit 270.

In the destuffing circuit 270, the write clock control circuit 275 receives the supply of the output of the divider 293 as a write clock controlling a buffer memory 271. This write clock is controlled by output signals from the dividers 294 and 295 and the stuff control bit detector 282. An output signal from a write-in counter 274, run by the write clock, serves to store the bit information of the bit stream on the line 52 in the memory 271.

A read-out counter 272 runs in response to the output clock of a voltage-controlled oscillator (VCO) 279. The phase of the output signal of the write-in counter 274 is compared by a phase comparator 276 with that of the output signal of the read-out counter 272, and the resultant phase difference signal is supplied to a low-pass filter (LPF) 278, which further feeds the signal, deprived of its high-frequency component, to the VCO 279. Therefore, the VCO 279, the read-out counter 272, the phase comparator 276, the LPF 278 and lines 63, 64, 65 and 66 connecting them constitute a phase-locked loop, and the oscillating frequency of the VCO 279 is so set as to serve as the clock for the bit stream after destuffing.

The write clock control circuit 275 inhibits the write clock with the output of the divider 294 at a rate of one in every 16 pulses. Since, therefore, the write-in counter 274 is suspended from running in the time slots corresponding to the service bits in the format shown in FIG. 2, information corresponding to these time slots is not written into the buffer memory 171, but only data bits are. The write clock control circuit 275, which further receives a signal from the divider 295, is fed with one out of every 128 pulses of the write clock. Upon receiving this pulse, if the output of the stuff information bit detector is on, or if $\{S_1, S_2, S_3\} = \{1, 1, 1\}$ is detected, it will be assumed that stuffing has been performed on the transmitting side, and the write clock control circuit 275 will inhibit the write clock. During this time, the write-in counter 274 is suspended from running, and so is the writing of the stuff bit into the buffer memory 271. Since, therefore, the bits of the bit stream written into the buffer memory 271 then are composed of other information than the stuff bit and all service bits, the read-out counter 272 which does not stop but keeps on running reads out on a line 256 a bit stream consisting only of data bits, so that the 45 Mbits/s data of the 6th channel on the transmitting side can be taken out.

As hitherto described, according to the present invention, bit streams on n channels are synchronized, and then the synchronized bit streams are multiplexed after converting each block of n bits of information therein into an m-bit block of parallel codes. Therefore, unlike in nBmB conversion after multiplexing, neither P-S nor S-P converters are required, so that the hardware can be made more compact and less expensive.

It is to be understood that the embodiment described herein is merely illustrative of the principles of the invention. Various modifications thereto may be effected by persons skilled in the art without departing from the spirit and scope of the invention. For example, n need not be 6, or m need not be 8, in nBmB conversion. While the invention is described above with reference to an optical fiber system, it is applicable to a coaxial cable system as well.

What is claimed is:

1. A time-division multiplexing apparatus for combining a plurality of input channel data bit streams into a single high output bit stream, comprising:

means for synchronizing each of n asynchronous input channel data bit streams each corresponding to respective input channels by stuffing control bits into said n asynchronous input channel data bit streams to produce n parallel synchronized bit streams, each of said n asynchronous input channel data bit streams being independent of each other;

means responsive to said n parallel synchronized bit streams for digital-to-digital converting a word of mutually corresponding parallel n bits, appearing at the same time, of said n parallel synchronized bit streams into another word of parallel m bits according to an nBmB coding rule to produce m synchronized bit streams, where m is greater than n; and for time-division multiplexing said m synchronized bit streams into an nBmB single high-speed output bit stream reflecting the time-division multiplexing of said n parallel input channel data bit streams originating in different data sources.

2. A multiplexing apparatus, as recited in claim 1, wherein said synchronizing means comprises pulse stuffing circuitry.

3. A multiplexing apparatus, as recited in claim 1, further comprising means for inserting service information into said synchronized bit streams.

4. A multiplexing apparatus, as recited in claim 1, wherein said converting means comprises an nBmB coder.

5. A multiplexing apparatus, as recited in claim 1, further comprising an optical transmitter for said output bit stream.

6. A time-division demultiplexing apparatus, comprising:

means responsive to a line code bit stream transmitted for generating a receiving-end single high-speed output bit stream having the same format as that of said transmitted line code bit stream;

means for demultiplexing said receiving-end single high-speed output bit stream in to receiving-end m synchronized bit streams;

means for converting mutually corresponding m bits of said receiving-end m synchronized bit streams into parallel n bits to produce receiving-end n synchronized bit streams, where m is greater than n; and means for removing the synchronization of each of said receiving-end n synchronized bit streams to produce n asynchronous, independent bit streams.

7. A method of multiplexing comprising the steps of:

synchronizing each of n asynchronous input data bit streams originating in different data sources by stuffing control bits into said n asynchronous input data bit streams to produce n synchronized bit streams;

converting mutually corresponding parallel n bits of said n synchronized bit streams into parallel m bits to produce m synchronized bit streams, where m is greater than n;

time-division multiplexing said m synchronized bit streams into a single high-speed output bit stream, reflecting the time-division multiplexing of said n parallel input channel data bit streams originating in different data sources.

8. A digital transmission system for use in time-division multiplex pulse code modulation comprising:

a time-division multiplexing apparatus for combining a plurality of input data bit streams originating in different data sources into a single high output bit stream, including means for synchronizing each of n asynchronous input data bit streams to produce n synchronized bit streams, means for converting mutually corresponding parallel n bits of said n synchronized bit streams into parallel m bits to produce ma synchronized bit streams where m is greater than n, and means for multiplexing said m synchronized bit streams into a single high-speed output bit stream reflecting the time-division multiplexing of said n parallel input channel data bit streams originating in different data sources; and a time-division demultiplexing apparatus including, means responsive to a line code stream transmitted through the transmission line for generating a receiving-end single high-speed output bit stream having the same formate as that of said transmitted line code stream, means for demultiplexing said receiving-end single high-speed output stream into receiving-end m synchronized bit streams, means for converting mutually corresponding m bits of said receiving-end m synchronized bit streams into parallel n bits to produce receiving-end n synchronized bit streams, where m is greater than n, and means for desynchronizing each of said receiving-end n synchronized bit streams to produce n asynchronous bit streams.

9. A time-division multiplexing apparatus for combining a plurality of input channel data bit streams into a single high output bit stream, comprising:

means for synchronizing each of n asynchronous input channel data bit streams each corresponding to respective input channels to produce n parallel synchronized input channel data bit streams and for producing an additional time slot in each of said n parallel synchronized input channel data bit streams for every predetermined number of data bits, each of said n asynchronous input channel data bit streams being independent of each other;

means for inserting service bits in the additional time slots of respective ones of said n parallel synchronized input channel data bit streams to produce parallel n service-bit-inserted bit streams, said service bits including framing bits which appear for every preselected number of bits in each of said n parallel synchronized input channel data bit streams;

means for converting mutually corresponding parallel n-bits of said parallel n service-bit-inserted bit streams into parallel m-bits according to an nBmB coding rule to produce parallel m bit streams, where m is greater than n; and means for multiplexing the parallel m bit streams into a single output bit stream having a framing bit pattern made-up of m bits which correspond to n framing bits taken out in the same timing of said n service-bit-inserted bit streams.

* * * * *

UNITED STATES PATENT AND TRADEMARK OFFICE
CERTIFICATE OF CORRECTION

PATENT NO. : 4,744,082
DATED : May 10, 1988
INVENTOR(S) : FUJIMURA et al

It is certified that error appears in the above-identified patent and that said Letters Patent is hereby corrected as shown below:

COLUMN 5, LINE 22 Delete "bitter" and insert --better--;

LINE 25 Delete "scramling" and insert --scrambling--;

COLUMN 6, LINE 23 Delete "t" and insert --to--;

COLUMN 9, LINE 27 Before "for" insert --and means--;

COLUMN 10, LINE 28 Delete "formate" and insert --format--.

Signed and Sealed this

Eighteenth Day of October, 1988

Attest:

DONALD J. QUIGG

Attesting Officer        Commissioner of Patents and Trademarks